(12) United States Patent
Kowaleski

(10) Patent No.: US 11,110,538 B2
(45) Date of Patent: Sep. 7, 2021

(54) SYSTEMS AND METHODS FOR ADJUSTING MULTIPLE SETTINGS OF A WELDING POWER SUPPLY

(75) Inventor: Anthony Joseph Kowaleski, Manawa, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/424,855

(22) Filed: Mar. 20, 2012

(65) Prior Publication Data
US 2012/0241428 A1  Sep. 27, 2012

Related U.S. Application Data

(60) Provisional application No. 61/467,434, filed on Mar. 25, 2011.

(51) Int. Cl.
*B23K 9/10* (2006.01)

(52) U.S. Cl.
CPC ................... *B23K 9/1006* (2013.01)

(58) Field of Classification Search
CPC ...... B23K 9/1006; B23K 9/1062; B23K 9/10; B23K 11/252; B23K 37/00; B23K 9/1087; B23K 9/1056; B23K 11/25; B23K 9/0953; B23K 31/125; H04W 4/02; H04W 4/029; H04W 12/1206; H04W 8/22; H04W 12/0802; H04W 12/00504; H04W 12/00503; H04W 4/38; H04W 4/021; H04W 4/026; H04W 4/50; H04W 64/00; H04W 88/16; H04W 60/00; H04W 48/16; H04W 8/26; H04W 4/00; H04W 24/00; B29C 66/5344; B29C 65/34; B29C 66/522; B29C 66/9674; B29C 66/9672; B29C 66/91411; B29C 66/91655;
(Continued)

(56) References Cited

U.S. PATENT DOCUMENTS

| 6,624,388 B1 | 9/2003 | Blankenship et al. |
| 6,797,921 B1 * | 9/2004 | Niedereder .......... B23K 9/1062 |
| | | 219/130.5 |

(Continued)

FOREIGN PATENT DOCUMENTS

| CN | 1695866 | 11/2005 |
| EP | 1380377 A2 | 1/2004 |
| WO | 02058878 A1 | 8/2002 |

OTHER PUBLICATIONS

Swagelok Company, Swagelok Welding System M200 Power Supply, Nov. 2009.*
(Continued)

*Primary Examiner* — Sang Y Paik
*Assistant Examiner* — Diallo I Duniver
(74) *Attorney, Agent, or Firm* — McAndrews, Held & Malloy, Ltd

(57) ABSTRACT

A method for adjusting multiple settings of a welding power supply is provided. The method includes providing a plurality of selectable identifiers. Each selectable identifier corresponds to a plurality of user adjustable welding power supply settings. The method also includes receiving an indication to select one of the plurality of selectable identifiers. The method includes adjusting the plurality of user adjustable welding power supply settings that correspond to the received indication.

7 Claims, 3 Drawing Sheets

(58) Field of Classification Search
CPC ............ B29C 66/91653; B29C 66/944; G05B 19/4186; G05B 2219/31186; G05B 2219/34444; G05B 19/042; G05B 2219/34038; G05B 19/0426; G05B 2219/23297; G05B 2219/23298; G05B 2219/25192; G05B 19/04; Y02P 90/02; G06Q 30/0607; G06Q 30/06; G06Q 30/00; G06Q 10/06; G06Q 50/06; G06F 15/173; G06F 17/30241; G06F 17/30; G06F 16/29; G06F 3/0482; G06F 21/88; G06F 17/00; G06F 3/041; G06F 3/048; H04M 11/002; H04M 1/66; G09G 5/00; G01S 5/02; G01S 19/39; G01C 21/28; G01C 21/00; Y02D 70/142; Y02D 70/1224; Y02D 70/1226; Y02D 70/144; Y02D 70/146; Y02D 30/70; Y02D 70/164; Y02D 70/23
USPC ................... 219/130.1; 455/418, 456.1, 411; 701/213, 50, 207, 221; 700/96, 117, 145, 700/110, 212; 715/772, 702, 738; 709/201, 229; 705/26, 26.25; 340/988, 340/539.13, 995.1, 539.32, 5.8, 5.31; 56/10.2 A; 345/629
See application file for complete search history.

(56) References Cited

U.S. PATENT DOCUMENTS

| 7,363,137 | B2 * | 4/2008 | Brant .................... G01S 5/02 340/988 |
| 7,643,890 | B1 * | 1/2010 | Hillen ................. B23K 9/1062 700/17 |
| 8,224,881 | B1 * | 7/2012 | Spear et al. .................. 707/899 |
| 2003/0212684 | A1 | 11/2003 | Meyer et al. |
| 2005/0035105 | A1 | 2/2005 | Spear |
| 2005/0103767 | A1 * | 5/2005 | Kainec .................... B23K 9/10 219/130.5 |
| 2006/0196862 | A1 | 9/2006 | Sickels |
| 2006/0207980 | A1 * | 9/2006 | Jacovetty ............. B23K 9/1062 219/130.5 |
| 2006/0218031 | A1 * | 9/2006 | Weinberg ............... G06Q 30/02 705/7.32 |
| 2009/0234483 | A1 * | 9/2009 | Leko .................... B23K 9/0953 700/110 |
| 2009/0313549 | A1 | 12/2009 | Casner et al. |
| 2010/0062405 | A1 * | 3/2010 | Zboray ................. G09B 19/24 434/234 |
| 2010/0320183 | A1 | 12/2010 | Borchert |

OTHER PUBLICATIONS

International Search Report & Written Opinion of PCT/US2012/029982 dated Jul. 23, 2012.
Canadian Office Action Appln No. 2,831,295 dated Nov. 6, 2017 (4 pages).
Lincoln Electric, "Power Wave Manager user Manual", pp. 26-27, http://lincolnelectric.com/en-za/equipment/Documents/PowerWaveManager.pdf, Jan. 25, 2011.
Canadian Office Action Appln No. 2,831,295 dated Sep. 19, 2018 (5 pages).
ESAB, "PEK Control panel", A2, A6, Instruction manual, 2009, http://pdfmanuals.esab.com/private/Library/InstructionManuals/0460%20949%20174%20GB.pdf (70 pages).
Canadian Office Action Appln No. 2,831,295 dated Sep. 23, 2019 (7 pages).
Canadian Office Action Application No. 2,831,295 dated Aug. 25, 2020 (7 pages).

* cited by examiner

| | METRIC | CE PROGRAMS | SCALING | LANGUAGE |
|---|---|---|---|---|
| IDENTIFIER 1 | ON | OFF | OFF | PORTUGESE |
| IDENTIFIER 2 | OFF | OFF | OFF | ENGLISH |
| IDENTIFIER 3 | ON | ON | ON | FRENCH |
| IDENTIFIER 4 | ON | ON | ON | GERMAN |
| IDENTIFIER 5 | ON | ON | ON | ITALIAN |
| IDENTIFIER 6 | OFF | OFF | OFF | SPANISH |
| IDENTIFIER 7 | ON | ON | ON | SPANISH |
| IDENTIFIER 8 | OFF | OFF | ON | ENGLISH |
| IDENTIFIER 9 | OFF | OFF | OFF | ENGLISH |

SYSTEMS AND METHODS FOR ADJUSTING MULTIPLE SETTINGS OF A WELDING POWER SUPPLY

CROSS REFERENCE TO RELATED APPLICATIONS

This application is a Non-Provisional patent application of U.S. Provisional Patent Application No. 61/467,434 entitled "Automatic Welding Power Source Configuration Based on Region/Country Selected via Web Based Means", filed Mar. 25, 2011, which is herein incorporated by reference in its entirety.

BACKGROUND

The invention relates generally to welding applications, and, more particularly, to systems and methods for adjusting multiple settings of a welding power supply.

Welding is a process that has become increasingly ubiquitous in various industries and applications. Such processes may be automated in certain contexts, although a large number of applications continue to exist for manual welding applications. In both cases, such welding applications rely on a variety of types of equipment to ensure that the supply of welding consumables (e.g., wire, shielding gas, etc.) is provided to the weld in an appropriate amount at the desired time. For example, metal inert gas (MIG) welding typically relies on a wire feeder to enable a welding wire to reach a welding torch. The wire is continuously fed during welding to provide filler metal. A power source ensures that arc heating is available to melt the filler metal and the underlying base metal.

Welding systems generally have many user adjustable settings that may be configured based on user preferences, language, location, work environment, and so forth. As will be appreciated, certain geographic regions (e.g., countries) and/or work environments (e.g., companies or organizations) may have standard groups of settings that are generally used by welding systems within those regions or environments. A considerable amount of time may be spent configuring the welding systems based on the geographic region and/or the work environment associated with the welding systems. For example, an operator may have to navigate through multiple menus to set multiple settings. Accordingly, there is a need in the field for systems and methods that allow welding systems to be configured more efficiently and in a simplified manner.

BRIEF DESCRIPTION

In one embodiment, a method for adjusting multiple settings of a welding power supply includes providing a plurality of selectable identifiers. Each selectable identifier corresponds to a plurality of user adjustable welding power supply settings. The method also includes receiving an indication to select one of the plurality of selectable identifiers. The method includes adjusting the plurality of user adjustable welding power supply settings that correspond to the received indication.

In another embodiment, a welding system includes control circuitry configured to provide a plurality of selectable identifiers and to receive an indication to select one of the plurality of selectable identifiers. The control circuitry is also configured to adjust a plurality of user adjustable welding system settings that correspond to the received indication. Each of the plurality of selectable identifiers corresponds to a country, a language, an organization, or some combination thereof.

In another embodiment, a method for adjusting multiple settings of a welding system, an induction heating system, or a plasma cutting system includes providing a plurality of selectable identifiers. Each selectable identifier corresponds to a plurality of user adjustable system settings and each selectable identifier identifies a country, a language, an organization, or some combination thereof. The method also includes receiving an indication to select one of the plurality of selectable identifiers. The method includes adjusting the plurality of user adjustable system settings for the welding system, the induction heating system, or the plasma cutting system that correspond to the received indication.

DRAWINGS

These and other features, aspects, and advantages of the present invention will become better understood when the following detailed description is read with reference to the accompanying drawings in which like characters represent like parts throughout the drawings, wherein.

Figures 2, 3:
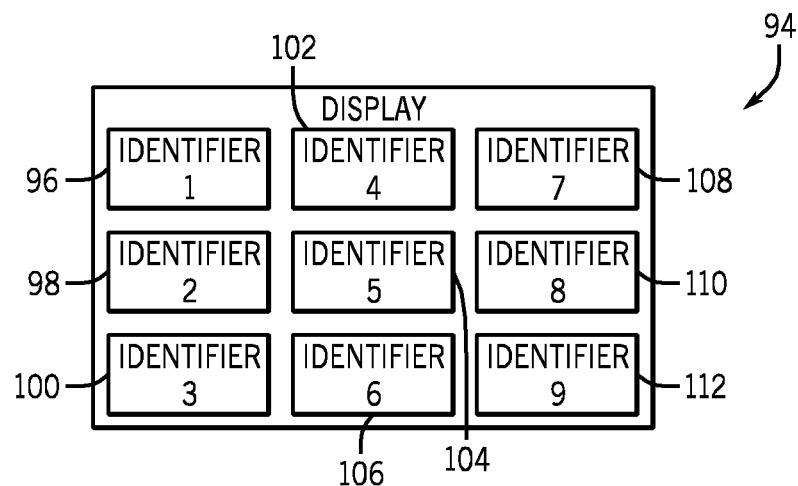
FIG. 2 is a block diagram of an embodiment of a display that shows selectable identifiers in accordance with aspects of the present disclosure.
Figure 4:
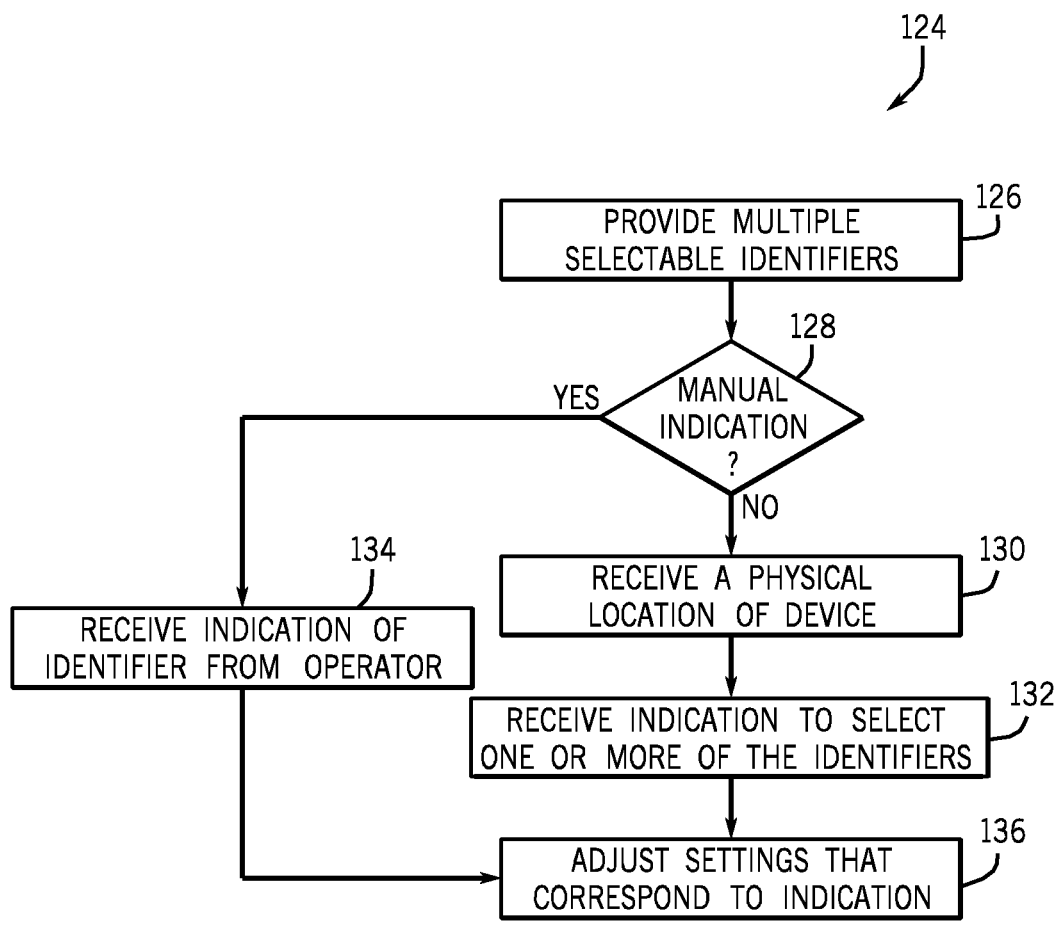

FIG. 3 is a block diagram of an embodiment of a table illustrating selectable identifiers with corresponding welding power supply settings in accordance with aspects of the present disclosure; and FIG. 4 is a flow chart of an embodiment of a method for adjusting multiple settings of a welding system, an induction heating system, or a plasma cutting system in accordance with aspects of the present disclosure.

DETAILED DESCRIPTION

Figure 1:
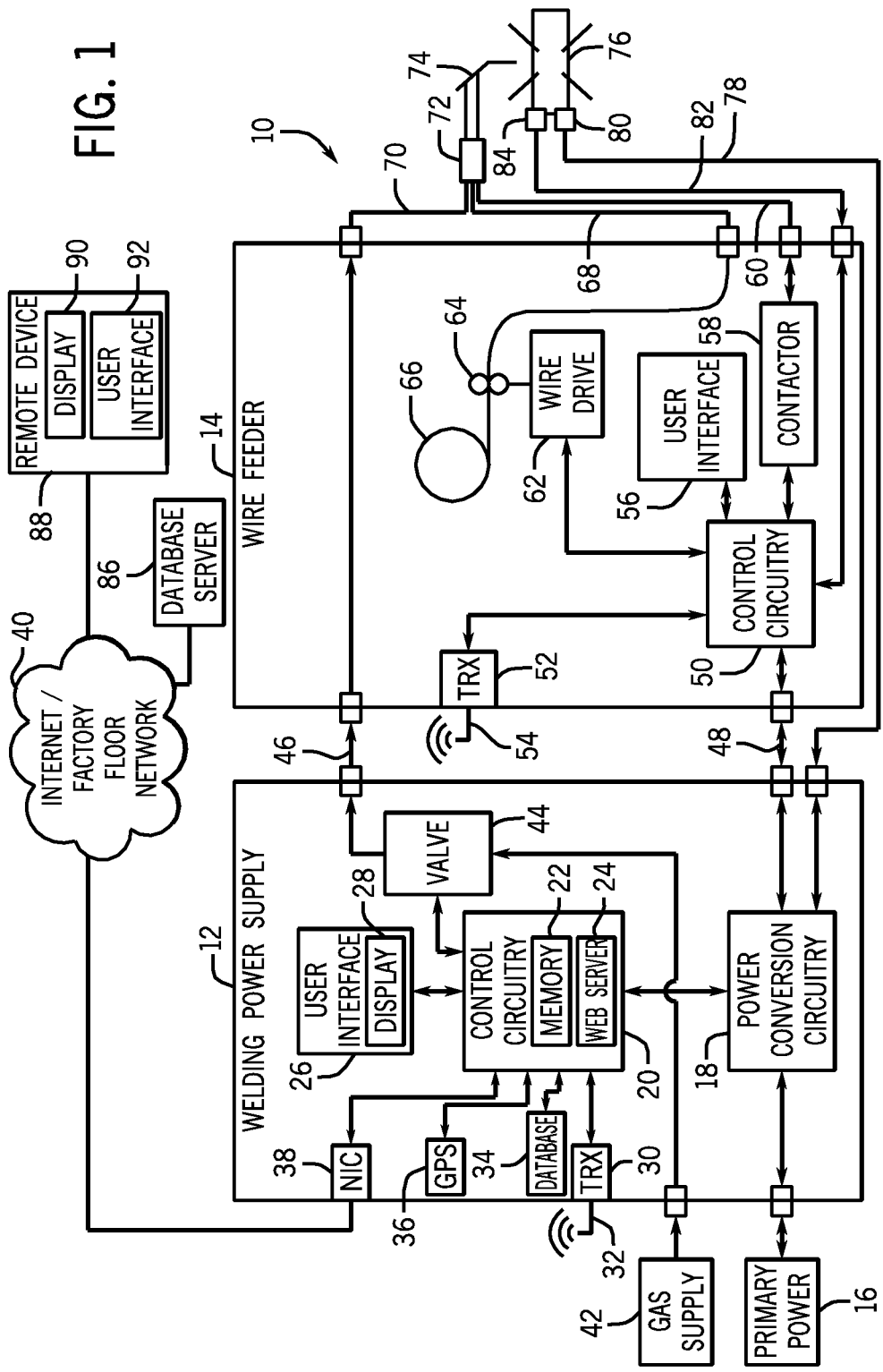
FIG. 1 is a block diagram of an embodiment of a welding system employing control circuitry for adjusting multiple settings of a welding power supply in accordance with aspects of the present disclosure.

Turning now to the drawings, FIG. 1 is a block diagram of an embodiment of a welding system 10 employing control circuitry for adjusting multiple settings of a welding power supply 12. In the illustrated embodiment, the welding system 10 is a metal inert gas (MIG) welding system, although the present techniques may be used on other welding systems, such as other gas metal arc welding (GMAW) systems, and so forth. The welding system 10 powers, controls, and supplies consumables to a welding application. The welding system 10 includes the welding power supply 12 and a voltage sensing wire feeder 14. As will be appreciated, other embodiments may include a non-voltage sensing wire feeder 14.

The welding power supply 12 receives primary power 16 (e.g., from the AC power grid, an engine/generator set, a battery, or other energy generating or storage devices, or a combination thereof), conditions the primary power, and provides an output power to one or more welding devices in accordance with demands of the system 10. The primary power 16 may be supplied from an offsite location (i.e., the primary power may originate from the power grid). Accordingly, the welding power supply 12 includes power conversion circuitry 18 that may include circuit elements such as transformers, rectifiers, switches, and so forth, capable of converting the AC input power to AC or DC output power as dictated by the demands of the system 10 (e.g., particular welding processes and regimes). Such circuits are generally known in the art.

In some embodiments, the power conversion circuitry 18 may be configured to convert the primary power 16 to both weld and auxiliary power outputs. However, in other embodiments, the power conversion circuitry 18 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 20. The control circuitry 20 may include at least one controller that controls the operations of the welding power supply 12, and may be configured to receive and process a plurality of inputs regarding the performance and demands of the system 10. Furthermore, the control circuitry 20 may include volatile or non-volatile memory 22, such as ROM, RAM, magnetic storage memory, optical storage memory, or a combination thereof. In addition, a variety of control regimes for various welding processes, along with associated settings and parameters may be stored in the memory along with code configured to provide a specific output (e.g., initiate wire feed, enable gas flow, etc.) during operation. The control circuitry 20 may also include a web server 24 (e.g., hardware and/or software for hosting a website on the welding power supply 12). The web server 24 may allow a user to access and/or control the welding power supply 12 from a remote location. For example, the web server 24 may provide multiple selectable identifiers to a user (e.g., country names, country flags, language, company name, organization, geographic region, etc.). Each of the selectable identifiers may correspond to multiple user adjustable welding power supply settings.

The welding power supply 12 includes a user interface 26. The control circuitry 20 may receive input from the user interface 26 through which a user may choose a process, and input desired parameters (e.g., voltages, currents, particular pulsed or non-pulsed welding regimes, and so forth). Furthermore, the control circuitry 20 may control parameters input by the user as well as any other parameters. Specifically, the user interface 26 includes a display 28 that may be used for presenting, or indicating, information to an operator (e.g., a country, flag, language, organization, etc.). The control circuitry 20 may include interface circuitry for communicating data to other devices in the system 10, such as the wire feeder 14. The welding power supply 12 includes a transceiver 30 for wirelessly communicating 32 with other welding devices. In certain embodiments, the welding power supply 12 may communicate with other welding devices using a wired connection, or some other communication method.

The welding power supply 12 may include a database 34 for storing configuration data, tables, or any other information. Further, the welding power supply 12 may include a geospatial locating device, such as a global positioning system (GPS) device 36. Using the GPS device 36, the control circuitry 20 may determine a physical location of the welding power supply 12. The welding power supply 12 may also include a device for wired communication with other devices, such as a network interface card (NIC) 38. By using the NIC 38, the welding power supply 12 may access data via a network 40 (e.g., the Internet and/or a factory floor network). Further, other devices may access the welding power supply 12 via the network 40.

A gas supply 42 provides shielding gases, such as argon, helium, carbon dioxide, and so forth, depending upon the welding application. The shielding gas flows to a valve 44, which controls the flow of gas, and if desired, may be selected to allow for modulating or regulating the amount of gas supplied to a welding application. The valve 44 may be opened, closed, or otherwise operated by the control circuitry 20 to enable, inhibit, or control gas flow through the valve 44. For example, when the valve 44 is closed, shielding gas may be inhibited from flowing through the valve 44. Conversely, when the valve 44 is opened, shielding gas is enabled to flow through the valve 44. Shielding gas exits the valve 44 and flows through a cable or hose 46 (which in some implementations may be packaged with the welding power output) to the wire feeder 14 which provides the shielding gas to the welding application.

Welding power flows through a cable 48 to the wire feeder 14. The wire feeder 14 may use the welding power to power the various components in the wire feeder 14, such as to power control circuitry 50 within the wire feeder 14. The control circuitry 50 controls the operations of the wire feeder 14. The wire feeder 14 also includes a transceiver 52 for wirelessly communicating 54 with the welding power supply 12, or another welding device. In some embodiments, the wire feeder 14 may communicate with other welding devices using a wired connection.

The wire feeder 14 includes a user interface 56. The control circuitry 50 may receive input from the user interface 56, such as via methods and devices described in relation to the user interface 26. Furthermore, the control circuitry 50 may display information to an operator, such as voltage, current, wire speed, wire type, and so forth. A contactor 58 (e.g., high amperage relay) is controlled by the control circuitry 50 and configured to enable or inhibit welding power to flow to a weld power cable 60 for the welding application. In certain embodiments, the contactor 58 may be an electromechanical device, while in other embodiments the contactor 58 may be any other suitable device, such as a solid state device. The wire feeder 14 includes a wire drive 62 that receives control signals from the control circuitry 50 to drive rollers 64 that rotate to pull wire off a spool 66 of wire. The wire is provided to the welding application through a cable 68. Likewise, the wire feeder 14 may provide shielding gas through a cable 70. As may be appreciated, the cables 60, 68, and 70 may be bundled together with a coupling device 72.

A torch 74 uses the wire, welding power, and shielding gas for a welding application. Further, the torch 74 is used to establish a welding arc between the torch 74 and a workpiece 76. A work cable 78, which may be terminated with a clamp 80 (or another power connecting device), couples the welding power supply 12 to the workpiece 76 to complete a welding power circuit. As illustrated, a voltage sense cable 82 is coupled from the wire feeder 14 to the workpiece 76 using a sense clamp 84 (or another power connecting mechanism). The wire feeder 14 is connected to the welding power supply 12 so that it may operate even when a welding arc is not formed by the torch 74. Specifically, the wire feeder 14 receives welding power from the welding power supply 12 through the cable 48. However, in certain embodiments, the wire feeder 14 may be powered through an alternate cable. In such embodiments, the voltage sense cable 82 may be replaced by wiring within the alternate cable. The welding power is connected to the various components in the wire feeder 14 (e.g., control circuitry 50, wire drive 62, user interface 56). A return path for the wire feeder 14 power is formed using the sense cable 82 with the sense clamp 84 connected to the workpiece 76. Further, the work cable 78 with the work clamp 80 provide the final portion of the return path to the welding power supply 12. Thus, the return path includes the cable 82, the workpiece 76, and the cable 78.

As illustrated, the welding system 10 includes a database server 86 and a remote device 88. In certain embodiments, the database server 86 may be used to store configuration data, tables, etc. that may be accessed by the welding power supply 12 via the network 40. The remote device 88 may include a display 90 and a user interface 92. Using the remote device 88, an operator may access the web server 24 of the welding power supply 12. As such, the operator may view web pages or other data provided by the web server 24 and/or the welding power supply 12. Further, the operator may select configuration options of the welding power supply 12 and/or the welding system 10 by remotely accessing the welding power supply 12. The remote device 88 may be any suitable device capable of accessing the network 40 (e.g., desktop computer, portable computer, tablet, cell phone, remote control device, and so forth).

For example, the control circuitry 20 (e.g., the web server 24) may provide multiple selectable identifiers to be displayed to the operator of a device (e.g., remote device 88). In certain embodiments, the multiple selectable identifiers may be displayed via a web page. The multiple selectable identifiers may each correspond to a country, a language, and/or an organization. The operator of the device may select one of the multiple selectable identifiers. Accordingly, the control circuitry 20 may receive an indication to select one of the multiple selectable identifiers based on the operator's selection. The control circuitry 20 may adjust multiple user adjustable welding system settings that correspond to the received indication.

The database 34 and/or the database 86 may be configured to store a representation of the multiple selectable identifiers and the multiple user adjustable welding system settings that correspond to the multiple selectable identifiers. In certain embodiments, the database 34 may receive updates via the network 40, such as from the database server 86, or another device. The control circuitry 20 may be configured to retrieve data from the database 34 and/or the database 86 to provide the multiple selectable identifiers, and to adjust the multiple user adjustable welding system settings. Therefore, by an operator selecting a single identifier of the multiple selectable identifiers, multiple user adjustable welding system settings of the welding power supply 12 may be configured.

During operation, the welding power supply 12 may be configured to automatically (e.g., without user or operator input) configure multiple user adjustable welding system settings. For example, the control circuitry 20 may be configured to determine a physical location of the welding power supply 12 and configure multiple user adjustable welding system settings based on the physical location of the welding power supply 12. The physical location of the welding power supply 12 may be determined by the GPS device 36, or another geospatial locating device. Further, the physical location of the welding power supply 12 may be determined using a geo location method (e.g., based on an Internet Protocol (IP) address of the welding power supply 12). As will be appreciated, the physical location may correspond to a geographic location, an organization, or a location within an organization, among other things.

FIG. 2 is a block diagram of an embodiment of a display 94 (e.g., which may be either of displays 28, 90 depicted in FIG. 1, or some other display) that shows selectable identifiers 96, 98, 100, 102, 104, 106, 108, 110, 112. In the present embodiment, the display 94 shows nine selectable identifiers 96, 98, 100, 102, 104, 106, 108, 110, 112; however, the display 94 may show any number of selectable identifiers 96, 98, 100, 102, 104, 106, 108, 110, 112. Further, as discussed above, the selectable identifiers 96, 98, 100, 102, 104, 106, 108, 110, 112 may include any suitable type of identifier that may make a group. For example, the selectable identifiers 96, 98, 100, 102, 104, 106, 108, 110, 112 may be pictorial representations of flags (e.g., of countries, states, and so forth), names and/or pictorial representations of countries, names and/or pictorial representations of states, names and/or pictorial representations of geographic regions, names and/or logos (or another representation) of organizations (e.g., of businesses, business divisions, plants, manufacturing facilities, and so forth), languages (e.g., "English", "Spanish" or "Español", "German" or "Deutsch", "French" or "Français", and so forth) and/or language abbreviations (e.g., "EN", "ES", "DE", "FR", and so forth), among other things. By an operator selecting one of the selectable identifiers 96, 98, 100, 102, 104, 106, 108, 110, 112, multiple user adjustable welding power supply settings that correspond to the selection may be adjusted.

FIG. 3 is a block diagram of an embodiment of a table 114 illustrating selectable identifiers 96, 98, 100, 102, 104, 106, 108, 110, 112 with corresponding welding power supply settings. In certain embodiments, the table 114 may be stored in one or both of the database 34 and the database server 86 illustrated in FIG. 1. As illustrated in FIG. 3, the welding power supply settings that correspond with the selectable identifiers 96, 98, 100, 102, 104, 106, 108, 110, 112 may include a metric setting 116 (e.g., metric ON may use the metric measurement system, metric OFF may use the English measurement system), a CE programs enabled setting 118 (e.g., to select welding schedule libraries), a scaling setting 120, and a language setting 122. Each of the selectable identifiers 96, 98, 100, 102, 104, 106, 108, 110, 112 may have a unique configuration of settings. Although only four settings are identified in the table 114, the table 114 may include fewer than or greater than four settings. During operation, if an operator selects one of the selectable identifiers 96, 98, 100, 102, 104, 106, 108, 110, 112, or if the welding power supply 12 automatically selects one of the selectable identifiers 96, 98, 100, 102, 104, 106, 108, 110, 112 (e.g., based on the physical location of the welding power supply 12, which may for example be determined by the GPS 36), each of the associated user adjustable welding power supply settings will be adjusted after the selection is made. Accordingly, the welding power supply 12 may be configured with a single selection.

FIG. 4 is a flow chart of an embodiment of a method 124 for adjusting multiple settings of a welding system, an induction heating system, or a plasma cutting system (e.g., the welding power supply 12). In this method 124, the system provides multiple selectable identifiers (block 126). In certain embodiments, the system may provide the multiple selectable identifiers using a web-based device (e.g., web server 24) to another web-based device (e.g., the remote device 88). In other embodiments, the system may provide the multiple selectable identifiers on a user interface (e.g., user interfaces 26, 56) of the system. Each selectable identifier may correspond to multiple user adjustable system settings (e.g., welding power supply 12 settings). Further, each selectable identifier may identify a country, a language, and/or an organization. The system determines whether a manual indication of the selectable identifier is to be made (block 128).

If a manual indication of the selectable identifier is not to be made (e.g., an automatic indication of the selectable identifier is going to be made), then a physical location of the system is received (block 130). For example, the system may determine its physical location using an IP address (e.g., geo-locating) or using a geospatial method (e.g., via a GPS device). After the system determines its physical location, the system receives an indication to select one or more of the selectable identifiers based on the physical location (block 132) of the system. For example, the system may look up the physical location in a database to find a corresponding country, organization, geographic region, and/or language that corresponds to the physical location.

If a manual indication of the selectable identifier is to be made, then the system receives an indication to select one of the selectable identifiers from an operator (block 134), for example, via one of the user interfaces 26, 56, 92. After either a manual indication or an automatic indication, the welding system, induction heating system, or plasma cutting system (e.g., welding power supply 12) adjusts the multiple user adjustable system settings (e.g., welding power supply 12 settings) that correspond to the indication (block 136). For example, as described above, the user adjustable system settings may be determined from the table 114 illustrated in FIG. 3 based on the indication.

Technical advantages of the embodiments disclosed herein include providing a system or device that automatically adjusts settings based on a physical location of the system or device (e.g., without the user actually selecting the settings), enabling easy configuration. Further, the system or device may be manually configured by making a single selection that adjusts multiple configuration items. Accordingly, the system or device may be configured in very little time and without searching through a variety of menus for specific settings. In addition, using a standard configuration, all appropriate settings that correspond to the configuration will be set without the concern that certain settings were not set.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for adjusting multiple settings of a power supply, the method comprising:
   automatically determining, via control circuitry of the power supply and at least one of a network interface of the power supply or a global positioning system (GPS) device of the power supply a physical location in which the power supply is located, and wherein the control circuitry automatically determines the physical location based on at least one of an Internet Protocol (IP) address received by the control circuitry from the network interface or a position received by the control circuitry from the GPS device;
   automatically determining, via the control circuitry of the power supply, one of a country, a language, or an organization that corresponds to the determined physical location;
   selecting, via the control circuitry of the power supply, a first identifier of a plurality of identifiers, wherein each of the plurality of identifiers corresponds to a plurality of power supply settings, and wherein the first identifier is automatically selected based on the determined country, language, or organization that corresponds to the determined physical location; and
   automatically adjusting, via the control circuitry of the power supply, the plurality of power supply settings that correspond to the first identifier, wherein the power supply is a welding power supply, a plasma cutting power supply, or an induction heating power supply.

2. The method of claim 1, comprising overriding the adjustment of the plurality of power supply settings based on an operator input selecting a second identifier of the plurality of identifiers, wherein overriding the adjustment comprises adjusting, via the control circuitry of the power supply, the plurality of power supply settings that correspond to the operator input selecting the second selectable identifier.

3. The method of claim 1, wherein the automatically determining a physical location in which the power supply is located comprises receiving a physical location of the power supply from the GPS device.

4. The method of claim 1, wherein the plurality of power supply settings comprises a language displayed by the power supply, a units system displayed by the power supply, a voltage, a current, or a combination thereof.

5. A method to configure a system, the method comprising:
   determining automatically, via control circuitry of the system and at least one of a network interface of the system or a global positioning system (GPS) device of the system, a geographical location at which the system is located, wherein the control circuitry automatically determines the geographic location based on at least one of an Internet Protocol (IP) address received by the control circuitry from the network interface or a position received by the control circuitry from the GPS device;
   automatically selecting, via the control circuitry of the system, a first identifier of a plurality of identifiers based on the determined geographic location at which system is located, wherein each of the plurality of identifiers corresponds to 1) one of a country, a language, or an organization, and 2) and a plurality of settings of the system; and
   automatically adjusting, via the control circuitry of the system, the plurality of settings that correspond to the first identifier;
   wherein the system is one of a welding system, a plasma cutting system, or an induction heating system, the method comprising.

6. The method of claim 5, wherein the geographical location corresponds to a country or a geographical region in which the system is located.

7. The method of claim 5, wherein the plurality of settings comprises a language displayed by the system, a units system displayed by the system, a voltage, a current, a welding process, or a combination thereof.

* * * * *